United States Patent
Zhao et al.

(10) Patent No.: US 12,235,927 B1
(45) Date of Patent: Feb. 25, 2025

(54) PROCESS-IN-MEMORY ARCHITECTURE BASED ON RESISTIVE RANDOM ACCESS MEMORY AND MATRIX DECOMPOSITION ACCELERATION ALGORITHM

(71) Applicant: ZHEJIANG UNIVERSITY, Zhejiang (CN)

(72) Inventors: Liang Zhao, Hangzhou (CN); Xiapeng Xu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 18/922,350

(22) Filed: Oct. 21, 2024

Related U.S. Application Data

(63) Continuation of application No. PCT/CN2024/073129, filed on Jan. 18, 2024.

(30) Foreign Application Priority Data

Oct. 13, 2023 (CN) .......................... 202311325100.7

(51) Int. Cl.
  G06F 17/16 (2006.01)
  G06F 5/01 (2006.01)
  G06F 12/0802 (2016.01)

(52) U.S. Cl.
  CPC ................ *G06F 17/16* (2013.01); *G06F 5/01* (2013.01); *G06F 12/0802* (2013.01); *G06F 2212/454* (2013.01)

(58) Field of Classification Search
  CPC ........ G06F 17/16; G06F 5/01; G06F 12/0802; G06F 2212/454

(Continued)

(56) References Cited

U.S. PATENT DOCUMENTS

2022/0129519 A1   4/2022   Zheng

FOREIGN PATENT DOCUMENTS

| CN | 114282164 A | 4/2022 |
|----|-------------|--------|
| CN | 115879530 A | 3/2023 |

(Continued)

OTHER PUBLICATIONS

International Search Report (PCT/CN2024/073129); Date of Mailing: Jun. 11, 2024; 5 pages.

(Continued)

*Primary Examiner* — Tan V Mai
(74) *Attorney, Agent, or Firm* — W&G Law Group

(57) ABSTRACT

A process-in-memory architecture based on a resistive random access memory and a matrix decomposition acceleration algorithm, which is configured for transformer neural network acceleration. The present disclosure first optimizes a self-attention computing process, decomposes a weight matrix, and reduces computing and writing operands; and further reduces whole power consumption using a softmax computing array of a selection and comparison logic structure based on the resistive random access memory. The present disclosure proposes an optimized matrix multiplication computing based on Re-Transformer, and further eliminates data dependency and reduces computing delay in scaled dot-product attention by using matrix decomposition. Meanwhile, the present disclosure reduces power consumption by using hybrid softmax based on the resistive random access memory.

7 Claims, 5 Drawing Sheets

(58) Field of Classification Search
USPC .......................................................... 708/200
See application file for complete search history.

(56) References Cited

FOREIGN PATENT DOCUMENTS

| | | |
|---|---|---|
| CN | 115965067 A | 4/2023 |
| CN | 117371500 A | 1/2024 |

OTHER PUBLICATIONS

Yang, Xiaoxuan et al. "ReTransformer: ReRAM-based Processing-in-Memory Architecture for Transformer Acceleration" ICCAD, Dec. 31, 2020 (Dec. 31, 2020) ; 9 pages.

PROCESS-IN-MEMORY ARCHITECTURE BASED ON RESISTIVE RANDOM ACCESS MEMORY AND MATRIX DECOMPOSITION ACCELERATION ALGORITHM

CROSS-REFERENCE TO RELATED APPLICATIONS

The present application is a continuation of International Application No. PCT/CN2024/073129, filed on Jan. 18, 2024, which claims priority to Chinese Application No. 202311325100.7, filed on Oct. 13, 2023, the contents of both of which are incorporated herein by reference in their entireties.

TECHNICAL FIELD

The present disclosure relates to the field of artificial intelligence algorithms and hardware, and in particular, to a process-in-memory architecture based on a resistive random access memory and a matrix decomposition acceleration algorithm and configured for transformer acceleration.

BACKGROUND

A Transformer has become a popular deep neural network (DNN) model in neuro-linguistic processing (NLP) application and shows excellent performance in aspect of neural machine translation and entity identification. A Transformer-based model, such as a generative pre-trained Transformer (GPT), Vision Transformer (ViT) and Swin-Transformer, has become one of most important progresses in the field of artificial intelligence. These models achieve higher accuracy than conventional convolutional neural networks (CNNs) and break dominance of the CNNs in various artificial intelligence tasks. Self-attention is an important mechanism in the Transformer model and configured to perform self-attention computing on each element in an input sequence and obtain self-attention representation of each element. The mechanism may capture a dependency relationship between the elements in the sequence, realize long-distance dependency modeling, achieve a multi-head attention mechanism, lower computing complexity and be a one of cores in the Transformer model. Thus, its computation is also one of core mathematical operation of the Transformer model.

Unfortunately, excellent accuracy of the Transformer-based model is at the expense of more operations, but an existing processor designed for the CNN cannot effectively process these operations. Though researchers have successfully applied the Process-In-Memory (PIM) architecture based on the resistive random access memory (ReRAM) to acceleration of the convolutional neural network (CNNs) and a recurrent neural network (RNNs), but a unique computing process of scaled dot-product attention in Transformer makes direct application of these designs difficult. In addition, the Transformer has to execute many matrix-to-matrix multiplication (MatMul) operations, wherein both matrixes are intermediate results of the previous layers. These intermediate results need to be written in a computing device in the preliminary work, and such operation may suspend the computing process and reduce a speed and energy efficiency.

SUMMARY

An objective of the present disclosure is to provide a process-in-memory architecture based on a resistive random access memory and a matrix decomposition acceleration algorithm against the defects in the prior art. The present disclosure transforms original matrix multiplication to vector multiplication and a dot product by decomposing a matrix by using properties of a symmetric matrix; and in addition, further optimizes a self-attention computing process based on a Re-Transformer by processing the computing process through introducing a hardware architecture.

The objective of the present disclosure is implemented through the following technical solutions. A process-in-memory architecture based on a resistive random access memory and a matrix decomposition acceleration algorithm includes:

a pretraining unit configured to train three network parameter weight matrixes $W_Q$, $W_K$ and $W_V$ of a Transformer neural network through a data set;

a decomposition unit configured to decompose matrix decomposition based on the weight matrixes $W_Q$ and $W_K$ obtained by the pretraining unit, wherein a decomposition formula is $W_Q \cdot W_K^T = W_{qk} = A+B$, where $W_{qk}$ represents a real square matrix, A represents a real symmetric matrix, B represents an antisymmetric matrix, A is calculated by $A = W_{qk} + W_{qk}^T/2$, and B is calculated by $B = W_{qk} - W_{qk}^T/2$; decompose based on properties of the real symmetric matrix and the antisymmetric matrix as $A = P' \cdot D \cdot P^T$, and $B = U \cdot C \cdot U^T$, where P represents an orthogonal matrix, D represents a diagonal matrix, U represents an invertible matrix, and C represents a block diagonal matrix;

a preprocessing unit configured to process an input matrix X and matrixes P, D, U and C obtained by the decomposition unit in row and column, respectively, and input the processed matrixes into a computing unit after being staggered;

a computing unit configured to perform multiply-accumulate computation on the matrixes outputted by the preprocessing unit using the resistive random access memory as a computing element to obtain a product matrix, wherein a formula of the multiply-accumulate computation is $Out = P' \cdot D \cdot P'^T + U' \cdot C \cdot U'^T$, where $P' = X \cdot P$, $U' = X \cdot U$, and Out represents an attention score;

a cache unit configured to store an intermediate result computed by the computing unit temporarily into the cache unit; and a self-attention mechanism unit configured to perform normalization computing on the product matrix Out obtained by the computing unit using a hybrid softmax computing array of a process-in-memory logic based on the resistive random access memory to obtain data $softmax[(P' \cdot D \cdot P'^T + U' \cdot C \cdot U'^T)/dk^{0.5})]$, where dk represents a dimension of a key-value matrix K, and perform matrix multiply computation on the obtained data $softmax[(P' \cdot D \cdot P'^T + U' \cdot C \cdot U'^T)/dk^{0.5})]$, the input matrix X and the weight matrix $W_V$ to obtain a self-attention weight coefficient.

Further, the three network parameter weight matrixes $W_Q$, $W_K$ and $W_V$ are randomly initialized when an initial Transformer neural network performs self-attention computation, and a query matrix Q, a key-value matrix K and a value matrix V are obtained by multiplying by the input matrix X after adding positional information.

Further, the self-attention computation of the Transformer neural network is calculated by $softmax(Q \cdot K^T/dk^{0.5}) \cdot V$, and the attention score $Out = Q \cdot K^T$ expanded as $Q \cdot K^T = (X \cdot W_Q) \cdot (X \cdot W_K)^T = X \cdot (W_Q \cdot W_K^T) X^T$;

a product result $W_{qk}$ based on $W_Q \cdot W_K^T$ is a square matrix, $W_{qk}$ is decomposed to be a sum of a real symmetric matrix A and an antisymmetric matrix B based on properties of the square matrix, and A is calculated by $A = W_{qk} + W_{qk}^T/2$, B is calculated by $B = W_{qk} - W_{qk}^T/2$; and decomposition results $A = P \cdot D \cdot P^T$, and $B = U \cdot C \cdot U^T$ i are obtained based on the properties of the real symmetric matrix and the antisymmetric matrix using orthogonal decomposition of the real symmetric matrix and Schur decomposition of the antisymmetric matrix, and D and C are in the following forms: $D = \text{diag}(\lambda_1, \lambda_2, \ldots, \lambda_i)$, where $\lambda_i$ represents an eigenvalue of the real symmetric matrix A, $i \in \{1,2,\ldots,m\}$, and m represents a number of rows of the weight matrix;

$$C = \text{diag}\left\{\begin{pmatrix} 0 & 1 \\ -1 & 0 \end{pmatrix}, \ldots, \begin{pmatrix} 0 & 1 \\ -1 & 0 \end{pmatrix}, 0, 0, 0, \ldots, 0\right\}.$$

Further, after the orthogonal matrix P, the invertible matrix U, the diagonal matrix D and the block diagonal matrix C are obtained, the attention score Out is represented as:

$$\text{Out} = X \cdot (W_Q \cdot W_K^T) \cdot X^T = X \cdot A \cdot X^T + X \cdot B \cdot X^T = (X \cdot P) D (X \cdot P)^T + (X \cdot U) C (X \cdot U)^T,$$

where $P' = X \cdot P$, and $U' = X \cdot U$, and the attention score Out is simplified to be as follow: $\text{Out} = P' \cdot D \cdot P'^T + U' \cdot C \cdot U'T$.

Further, after the attention score is obtained, the data $\text{softmax}[(P' \cdot D \cdot P'^T + U' \cdot C \cdot U'^T)/dk^{0.5})]$ is obtained using the hybrid softmax computing array of the process-in-memory logic based on the resistive random access memory, and a final self-attention weight coefficient Z is obtained by successively multiplying by the input matrix X and the weight matrix $W_V$, expressed as:

$$Z = \text{softmax}[(P' \cdot D \cdot P'^T + U' \cdot C \cdot U'^T)/dk^{0.5})] \cdot X \cdot W_V.$$

Further, complex matrix-to-matrix multiplication operation is simplified into matrix-to-vector multiplication and vector dot products using relevant properties of the symmetric matrix.

Further, the resistive random access memory is used in a Transformer for matrix vectors and softmax operations.

Compared to the prior art, the beneficial effects of the present disclosure are as follows: the present disclosure further optimizes a self-attention computing process based on Re-Transformer using some properties of the matrixes, simplifies the original matrix-to-matrix multiplication operation into matrix-to-vector multiplication and the vector dot products, and computes the intermediate result using an in-memory computing array represented by the resistive random access memory. The solution optimizes the matrix multiplication computing process and uses in-memory computing of the resistive random access memory, thereby reducing the need for many write and storage operations, and power consumption and latency, and a space required for storing the intermediate result. Besides, the sparse array design optimization method an effective optimization technique that enhances computational efficiency while reducing storage space. Therefore, the present disclosure decomposes part of original weight matrixes by using the properties of the matrixes, reducing the sparsity of the weight matrixes and further improving the utilization and accuracy of in-memory computing arrays.

BRIEF DESCRIPTION OF DRAWINGS

Related instances and solutions may be shown clearly and vividly by replacing part of texts with pictures in the accompanying drawings which are not necessarily drawn in scale. The accompanying drawings illustrate the specification and the claims vividly and specifically in a main form of schematic diagrams instead of serving as an accurate reference.

DESCRIPTION OF EMBODIMENTS

In order to make those skilled in the art better understand the technical solutions of the present disclosure, the present disclosure is described in detail below with reference to the accompanying drawings and specific implementations. Embodiments of the present disclosure are further described in detail below with reference to the accompanying drawings and specific embodiments instead of serving as a limitation on the present disclosure. If there is no necessity of a sequential relationship between various steps described herein, an order for describing the various steps as an example herein is not to be regarded as a limitation, those skilled in the art should know that the various steps are may be adjusted in order as long as algorithmic logicality between them is not violated and a whole process may be implemented.

Description of Related Technical Terms

Transformer Neural Network:

The Transformer is a seq2seq model based on an attention mechanism from a macroscopic perspective, and an encoder is responsible for mapping an input sequence $(x_1, \ldots, x_a)$ to a group of continuous sequences $z = (z_1, \ldots, z_a)$. For given z, a decoder generates an output sequence $(y_1, \ldots, y_b)$ once. In each step, the model is autoregressive. The Transformer follows this type of overall architecture, which is different from a conventional convolutional neural network (CNN) and a recurrent neural network (RNN), and the whole network is completely composed of a self-attention mechanism (Self-Attention) and a Feed Forward Neural Network. In general, the Transformer neural network is composed of an Encoder and a Decoder.

The Encoder is composed of N same Encoder blocks which are stacked, and the Decoder is also composed of N same Decoder blocks which are overlaid. The Encoder plays a role in computing correlation of data between input sequences. Each Encoder block includes a Multi-Head Attention layer for computing global scope information of input data. Self-Attention adopts a parallel computing strategy for simultaneously processing all input sequential data, so computing efficiency of the model is very high. Overlaying a plurality of layers of Encoders may better explore a potential connection of data between sequences. The Decoder plays a role in outputting a to-be-predicted sequence by combining global related information between the previous sequences.

Figure 1:
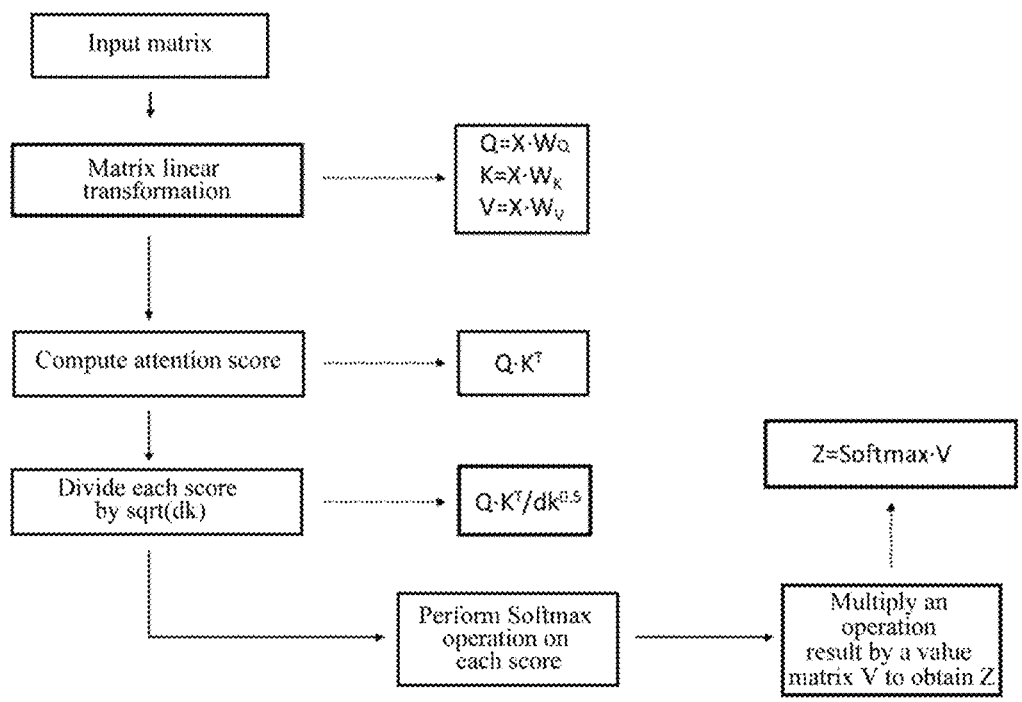
FIG. 1 shows computing steps of conventional Transformer self-attention.

Self-Attention Mechanism (Self-Attention):

The conventional Attention mechanism occurs between elements of a target set (Target) and elements of a source set (Source). Briefly speaking, computing of weights in the Attention mechanism needs participation of Target. That is, in an Encoder-Decoder model, computing of Attention weights needs not only a hidden state in the Encoder, but also a hidden state in the Decoder. The Self-Attention mechanism performs parallel computing for a pairwise weight relationship between each vector in the input sequence and one of all other vectors, which is a relationship in a global scope. Thus, corresponding matrix operations need to be performed only at the Source instead of using information in the Target. Computing steps of the conventional self-attention mechanism are shown in FIG. 1.

The three network parameter weight matrixes $W_Q$, $W_K$ and $W_V$ are randomly initialized when an initial Transformer neural network performs self-attention computing, and a query matrix Q, a key-value matrix K and a value matrix V are obtained by multiplying by the input matrix X to which position information is added, so that self-attention computing is assisted:

$$Q=X \cdot W_Q$$

$$K=X \cdot W_K$$

$$V=X \cdot W_V$$

$$W_Q, W_K, W_V \in R^{m \times n}$$

$$\text{Out}=Q \cdot K^T,$$

where m and n are the number of rows and the number of columns of the weight matrixes, respectively; Out represents an attention score; and a superscript T represents a transpose of a matrix.

Figure 2:
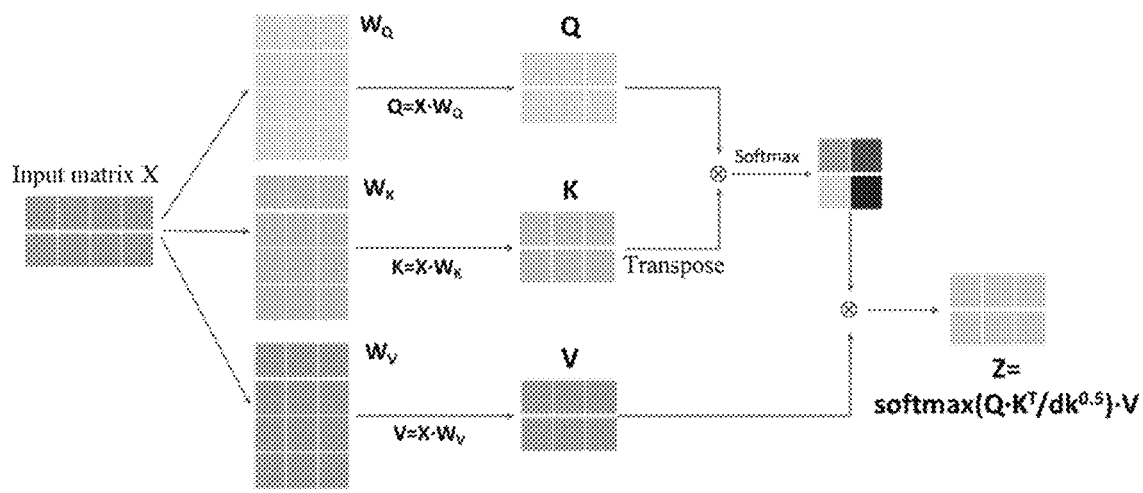
FIG. 2 shows a flowchart of computing of conventional Transformer self-attention.

The self-attention weight coefficient Z is obtained by computing through three matrixes of Q, K and V, and a computing formula is as follows:

$$Z=\text{Attention}(Q,K,V)=\text{softmax}(Q \cdot K^T/dk^{0.5}) \cdot V,$$

where dk represents a dimension of the key-value matrix K, and Attention is a self-attention function. In order to prevent a situation that too large inner product of Q and K causes a self-attention weight coefficient to deviate to the extreme, dividing by $dk^{0.5}$ during computing plays a role in buffering. The Attention function is configured to compute a concern extent of each position data in the input sequence with respect to all position data, and if a relational degree between two elements is higher, the corresponding attention weight is greater. There is no sequential order of input vectors in the whole computing process, and parallel computing is implemented through making the matrixes. FIG. 2 shows a related computing process.

Yang, et al. propose a PIM architecture based on ReRAM in a paper "Re-Transformer:ReRAM-based processing-in-memory architecture for transformer acceleration" for accelerating the Transformer, a core concept of which mainly includes:

In a matrix linear transformation, the weight matrix $W_K$ is transformed to $W_K^T$ others are not transformed, and Q is computed at the same time. Compared with an initial Transformer, only Q is computed in this step.

During computing of the attention score, a formula $(Q \cdot W_K^T) \cdot X^T$ is adopted, and an extra $X^T$ needs to be cached in this step.

Hybrid Softmax operation is performed on each attention score, and this softmax operation adopts a selection and comparison logic of ReRAM.

Figure 3:
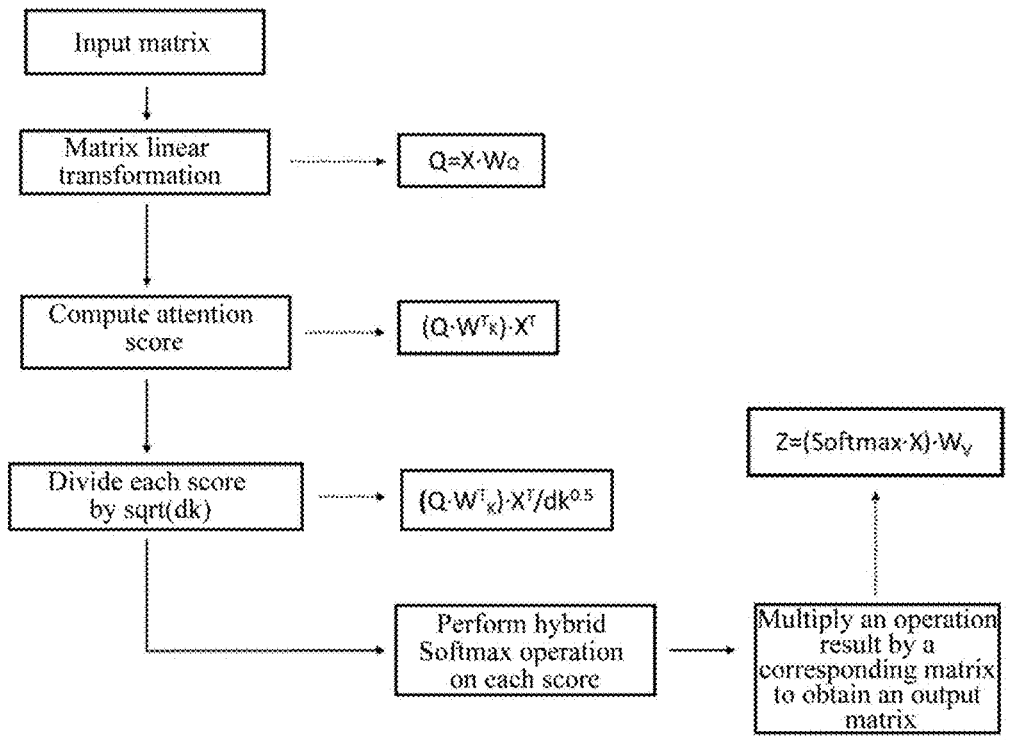
FIG. 3 shows computing steps of Re-Transformer self-attention for ReRAM process-in-memory computing.

The softmax operation result is right multiplied by the input matrix X and the weight matrix $W_V$ in succession to obtain the self-attention weight coefficient Z. Total computing steps are shown in FIG. 3.

Figure 4:
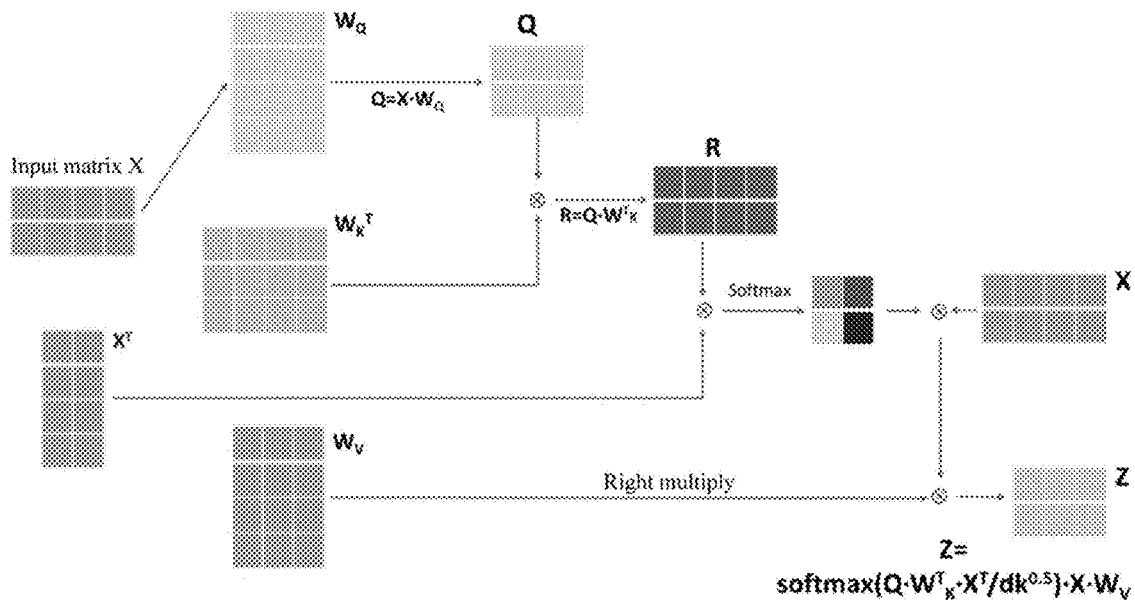
FIG. 4 shows a flowchart of computing of Re-Transformer self-attention.

The detailed computing process is shown in FIG. 4 and mainly includes:

$$Q=X \cdot W_Q$$

$$R=Q \cdot W_K^T$$

$$\text{Out}=R \cdot X^T$$

$$Z=[\text{softmax}(R \cdot X^T/dk^{0.5}) \cdot X] \cdot W_V,$$

where R is an intermediate matrix.

The present disclosure provides the process-in-memory architecture based on the resistive random access memory and the matrix decomposition acceleration algorithm, which is configured for transformer neural network acceleration, recorded as an Eigen-Transformer, which makes innovation mainly in aspects of self-attention acceleration algorithms and hardware architectures.

Figure 5:
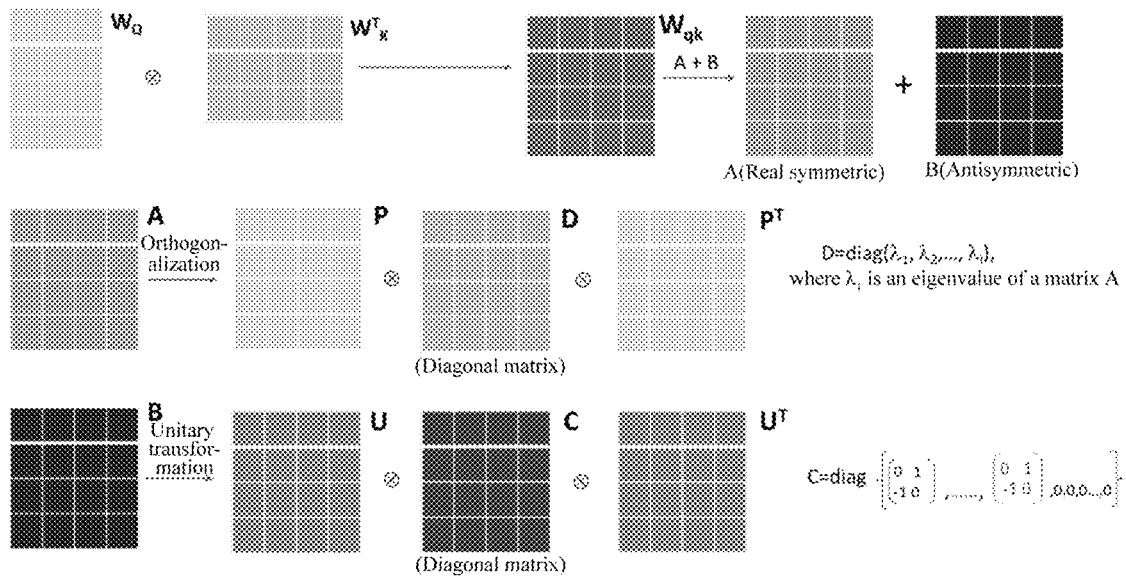
FIG. 5 shows a core concept of simplifying Self-Attention computing by using matrix decomposition in an Eigen-Transformer of the present disclosure.

In the aspect of self-attention acceleration algorithm, self-attention computing of the initial Transformer is further optimized based on the Re-Transformer by using matrix decomposition and some properties of the symmetric matrix, a core concept of which is shown in FIG. 5 and mainly comes from as follows:

Any real square matrix may be decomposed into a sum of a real symmetric matrix and an antisymmetric matrix.

Any real symmetric matrix is definitely in orthogonal similarity with the diagonal matrix, and elements on a main diagonal of the diagonal matrix are all eigenvalues of the real symmetric matrix.

Any antisymmetric matrix may be decomposed and transformed to a block diagonal matrix through Schur decomposition.

In an example, conventional self-attention computing of the Transformer is softmax$(Q \cdot K^T/dk^{0.5}) \cdot V$, where $Q \cdot K^T$ is expanded to be:

$$\text{Out}=Q \cdot K^T=(X \cdot W_Q) \cdot (X \cdot W_K)^T=X \cdot (W_Q \cdot W_K^T) X^T$$

$$W_Q \cdot W_K^T = W_{qk} = A+B,$$

where $W_{qk}$ is a real square matrix, A is a real symmetric matrix, B is an antisymmetric matrix, $A=W_{qk}+W_{qk}^T/2$, and $B=W_{qk}-W_{qk}^T/2$.

The following decomposition is made based on the properties of the real symmetric matrix and the antisymmetric matrix, respectively:

$$A=P \cdot D \cdot P^T, \text{ and } B=U \cdot C \cdot U^T,$$

where P is an orthogonal matrix, D is a diagonal matrix, U is an invertible matrix, C is a block diagonal matrix, and D and C may be written in the following forms: D=diag($\lambda_1$, $\lambda_2, \ldots, \lambda_i$), where $\lambda_i$ is an eigenvalue of the real symmetric matrix A, i∈{1, 2, ..., m}, m represents a number of rows of the weight matrix, and $$C = \text{diag}\left\{\begin{pmatrix} 0 & 1 \\ -1 & 0 \end{pmatrix}, \ldots, \begin{pmatrix} 0 & 1 \\ -1 & 0 \end{pmatrix}, 0, 0, 0, \ldots, 0\right\}.$$

Figure 6:
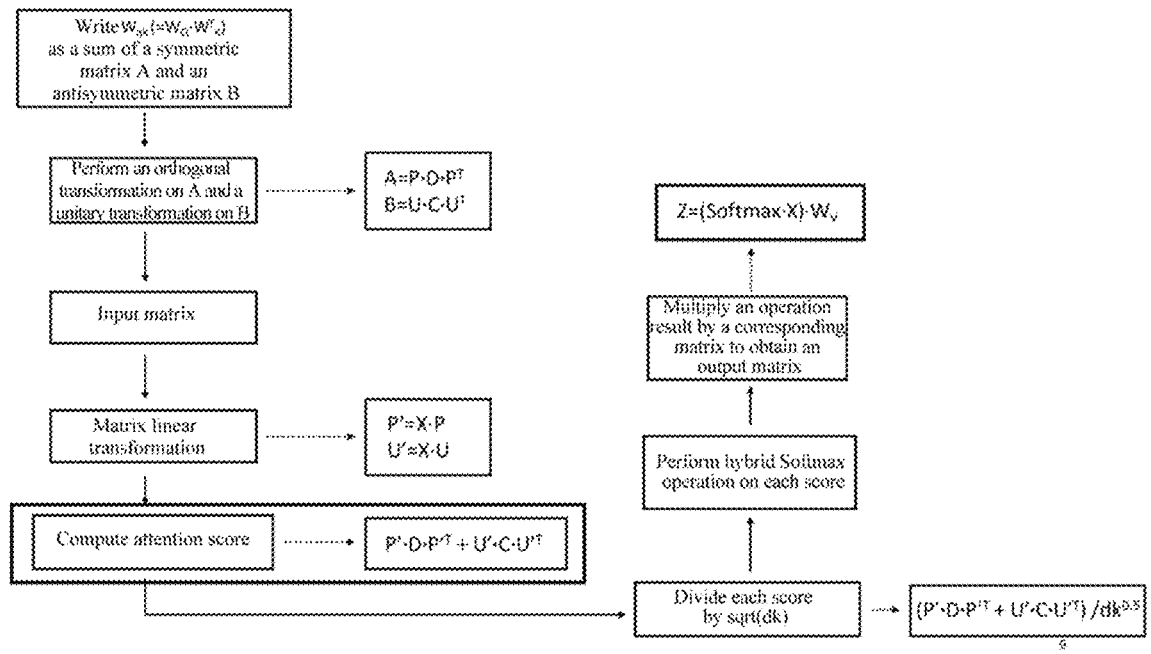
FIG. 6 shows a computing method and steps of Eigen-Transformer self-attention.

Based on the decomposition result, the original weights $W_Q$ and $W_K$ in self-attention computing of the initial Transformer are replaced by the orthogonal matrix P, the invertible matrix U, the diagonal matrix D and the block diagonal matrix C, so the computing steps are transformed to those shown in FIG. 6, and the attention score Out is expressed as:

$$\text{Out}=X \cdot (W_Q \cdot W_K^T) \cdot X^T = X \cdot A \cdot X^T + X \cdot B \cdot X^T = (X \cdot P) \cdot D \cdot (X \cdot P)^T + (X \cdot U) \cdot C \cdot (X \cdot U)^T$$

Figure 7:
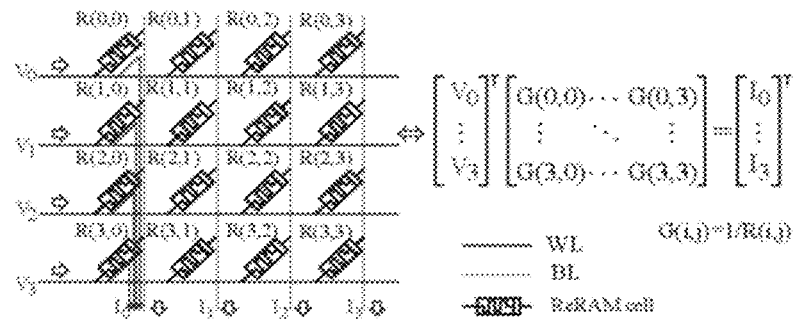
FIG. 7 shows a process-in-memory acceleration method of matrix-to-vector multiplication based on a resistive random access memory.
Figure 7:
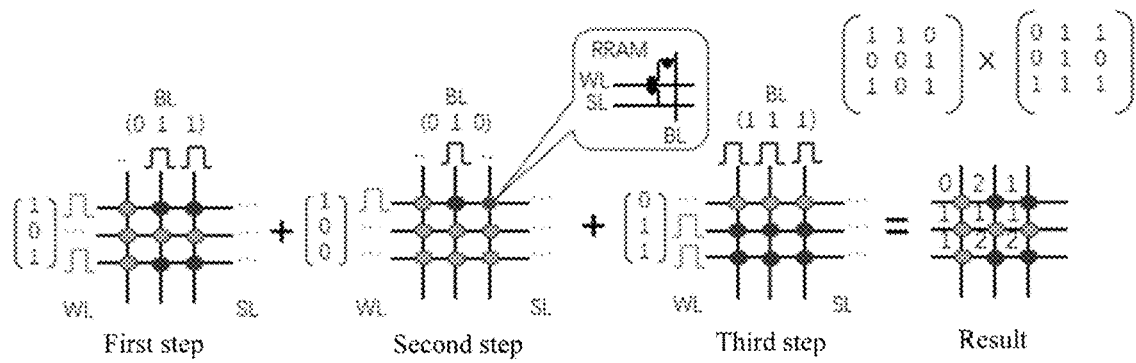

Making P'=X·P and U'=X·U, the computing step is suitable for a general in-memory computing format-matrix and input vector multiplication, so the present disclosure tries to compute matrix-to-matrix multiplication and matrix-to-vector multiplication through an in-memory computing array represented by the resistive random access memory, which essentially uses encoding input of physical quantities (for example, a voltage and a current), weights and output data, make the input data, weights and output data meet a mathematic relationship of matrix-to-vector multiplication by constructing a circuit, and completes this type of computing in high parallel in a simulated domain. A related computing paradigm is shown in FIG. 7.

Further, the self-attention computing is simplified to be:

$$\text{Out}=P' \cdot D \cdot P'^T + U' \cdot C \cdot U'^T$$

Further, by using hybrid softmax operation based on in-ReRAM logic proposed by the Re-Transformer work, the following operation result is obtained: Softmax$[(P' \cdot D \cdot P'^T + U' \cdot C \cdot U'^T)/dk^{0.5}]$, and D=diag$(\lambda_1, \lambda_2, \ldots \lambda_i)$, where $\lambda_i$ is an eigenvalue of the real symmetric matrix A, i∈{1,2, . . . ,m}.

Further, the result is multiplied by the input matrix X and the weight matrix $W_V$ in succession to obtain the finally outputted self-attention weight coefficient Z, which is specifically represented as: Z=softmax$[(P'D \cdot P'^T+U' \cdot C \cdot U'^T)/dk^{0.5}] \cdot X \cdot W_V$.

Figure 8:
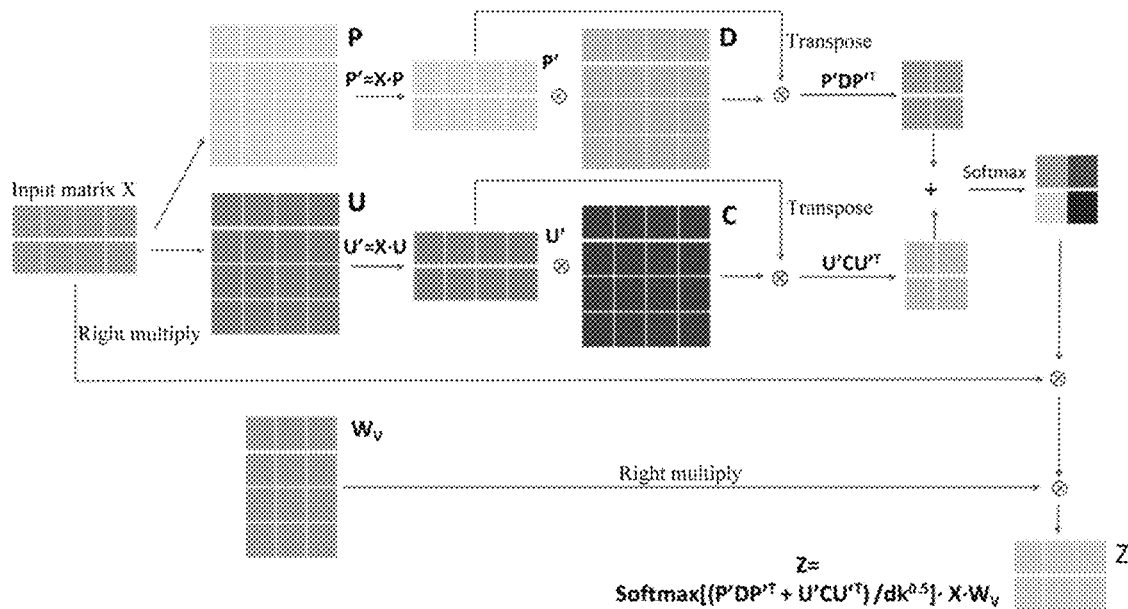
FIG. 8 shows a flowchart of computing of Eigen-Transformer self-attention.

A corresponding flowchart is drawn in FIG. 8 according to the above process.

In the present disclosure, self-attention computing mainly focuses on P', U', P'·D·P'$^T$ and U'·C·U'$^T$.

Taking P'·D·P'$^T$ as an example, due to the properties of the diagonal matrix D, a computing result $O_{ij}$ in an i$^{th}$ row and a j$^{th}$ column only needs to make an inner product with P'$_i$ and P'$_j$, P'$_i$ and P'$_j$ are vectors in an i$^{th}$ row and a j$^{th}$ row of a matrix P', wherein i≠j; then an output may be obtained by multiplying by an diagonal element in the diagonal matrix D; and besides, due to the properties of the symmetric matrix, only an upper-triangle or a lower triangle needs to be made to obtain a whole output matrix of computing this time.

Likewise, for computing of U'·C·U'T, the properties of the antisymmetric matrix and the block diagonal matrix are utilized, only an upper triangle element or a lower triangle element is computed so as to obtain a whole computing result, so the number of computing times of the whole process is greatly reduced. Meanwhile, the matrixes P' and U', and the diagonal elements of the diagonal matrix D and the block diagonal matrix C only need to be cached in the whole process, so the cache space is also reduced.

In the aspect of the hardware architecture, the present disclosure tries to apply the resistive random access memory (ReRAM) to the Transformer, and a corresponding hardware match measure is provided according to optimization made by the self-attention acceleration algorithm process, so as to improve acceleration computing, which mainly includes:

According to self-attention acceleration algorithm optimization made by the present disclosure, the computing process is transformed to matrix-to-vector multiplication and the vector dot products mainly from the original operation of matrix-to-matrix multiplication, so the present disclosure tries to compute related processes by using ReRAM-based process-in-memory logic, stores elements in the matrixes and the vectors into the ReRAM and performs operation by using a computing logic of the ReRAM, so computing power consumption and cache space may be reduced greatly.

In softmax operation, by using the hybrid softmax proposed based on a selection and comparison logic of the ReRAM, original softmax operation is transformed, the operation process is simplified by using the selection and comparison logic structure of the ReRAM, and related measures are described specifically in the paper of Re-Transformer.

Based on the above analysis, the process-in-memory architecture based on the resistive random access memory and the matrix decomposition acceleration algorithm provided by the present disclosure includes the following units:

A pretraining unit configured to train three network parameter weight matrixes $W_Q$, $W_K$ and $W_V$ of a Transformer neural network through a data set.

A decomposition unit configured to decompose matrix decomposition based on the weight matrixes $W_Q$ and $W_K$ obtained by the pretraining unit, wherein a decomposition formula is $W_Q \cdot W_K^T = W_{qk} = A+B$, where $W_{qk}$ represents a real square matrix, A represents a real symmetric matrix, B represents an antisymmetric matrix, A is calculated by A=$W_{qk}$+$W_{qk}^T$/2, and B is calculated by B=$W_{qk}$-$W_{qk}^T$/2; decompose based on properties of the real symmetric matrix and the antisymmetric matrix as A=P'·D·P$^T$, and B=U·C·U$^T$, where P represents an orthogonal matrix, D represents a diagonal matrix, U represents an invertible matrix, and C represents a block diagonal matrix.

A preprocessing unit configured to process an input matrix X and matrixes P, D, U and C obtained by the decomposition unit in row and column, respectively, and input the processed matrixes into a computing unit after being staggered.

A computing unit configured to perform multiply-accumulate computation on the matrixes outputted by the preprocessing unit using the resistive random access memory as a computing element to obtain a product matrix, wherein a formula of the multiply-accumulate computation is Out=P'·D·P'$^T$+U'·C·U'$^T$, where P'=X·P, U'=X·U, and Out represents an attention score.

A cache unit configured to store an intermediate result computed by the computing unit temporarily into the cache unit.

A self-attention mechanism unit configured to perform normalization computing on the product matrix Out obtained by the computing unit using a hybrid softmax computing array of a process-in-memory logic based on the resistive random access memory to obtain data softmax $[(P' \cdot D \cdot P'^T + U' \cdot C \cdot U'^T)/dk^{0.5}]$, where dk represents a dimension of a key-value matrix K, and perform matrix multiply computation on the obtained data softmax$[(P' \cdot D \cdot P'^T + U' \cdot C \cdot U'T)/dk^{0.5}]$, the input matrix X and the weight matrix $W_V$ to obtain a self-attention weight coefficient. The self-attention weight coefficient is outputted through a data output module.

Figure 9:
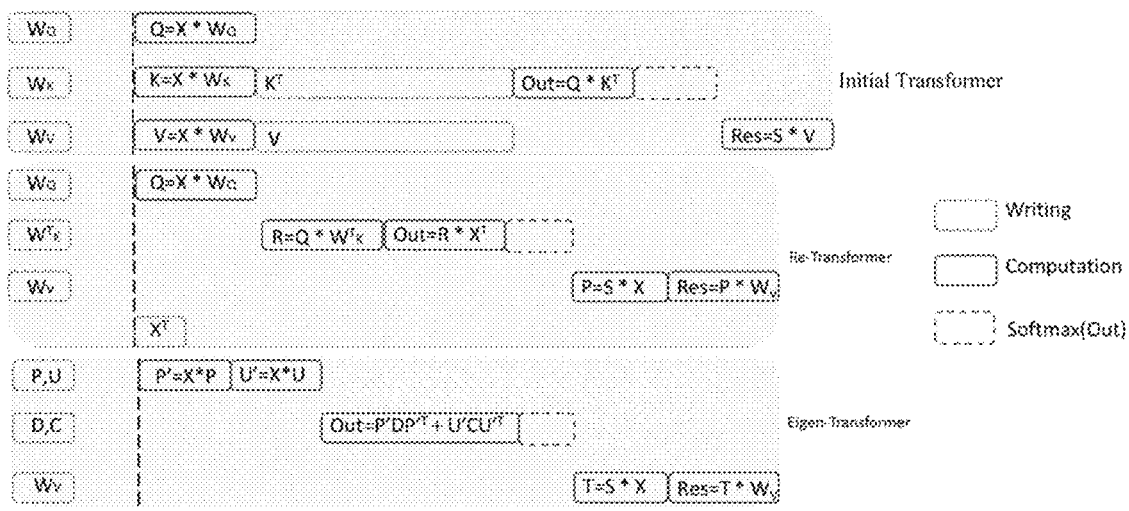
FIG. 9 shows description of a computing method for three types of Transformer self-attention involved in the present disclosure (including comparison of a needed cache space).

The initial Transformer, the Re-Transformer and the computing method for Eigen-Transformer in the present disclosure and the initial cache space are compared, and corresponding results are shown in FIG. 9.

The Eigen-Transformer in the present disclosure builds upon the Re-Transformer by further optimizing the self-attention computation of the initial Transformer using matrix decomposition techniques and properties of symmetric matrices: the query weight matrix WQ is decomposed into an orthogonal matrix P and an antisymmetric matrix U; and the key value matrix WK is decomposed into a diagonal matrix D and a block diagonal matrix C. Compared to the initial Transformer and Re-Transformer, the Eigen-Transformer in the present disclosure offers the following performance improvements: the matrix decomposition and matrix properties simplify the computation process, reduce the number of computation steps, and minimize caching requirements. By leveraging matrix properties (such as symmetric matrices and block diagonal matrices), only the upper or lower triangular elements need to be computed, further reducing the storage space required for intermediate results, and significantly lowering power consumption and latency. The Eigen-Transformer further employs the resistive random access memory for the self-attention computation in Transformers, enhancing computation efficiency and accuracy through an in-memory computing architecture. Therefore, the Eigen-Transformer significantly improves the efficiency of self-attention computation, reduces power consumption and storage requirements, and ultimately enhances overall system performance. Therefore, FIG. 9 clearly shows how the Eigen-Transformer of the present disclosure can achieve more efficient calculations on hardware by introducing matrix decomposition, thereby improving the overall efficiency of the Transformer model.

The hybrid softmax and the softmax based on the logic-in-ReRAM proposed in the Re-Transformer are adopted for the softmax operation part in the present disclosure, which thus is not repeated in the present disclosure.

The present disclosure is intended to optimize the self-attention computing process, so as to reduce computing and writing operands. Then operation is performed by using the softmax of the ReRAM-based selection and comparison logic structure, so as to further reduce whole power consumption.

Besides, the present disclosure has described the general process and concept of the present disclosure herein, and the scope covers any and all related algorithms and architectures that the present disclosure is based on. The operation method in the claims will be explained specifically in language used in the claims.

The above description is intended to be explanatory. Those ordinarily skilled in the art can make preliminary theoretical exploration when reading the above description and uses some auxiliary means for preliminary simulation. The main core concept of the present disclosure is to optimize self-attention computing by using the properties of the matrixes and try to compute a transition matrix used in this solution through the logic-in-ReRAM. Thus, those skilled in the related art can make further exploration and optimization.

What is claimed is:

1. A process-in-memory architecture based on a resistive random access memory and a matrix decomposition acceleration algorithm, comprising:
    a pretraining unit configured to train three network parameter weight matrixes $W_Q, W_K$ and $W_V$ of a Transformer neural network through a data set;
    a decomposition unit configured to decompose matrix decomposition based on the weight matrixes $W_Q$ and $W_K$ obtained by the pretraining unit, wherein a decomposition formula is $W_Q \cdot W_K^T = W_{qk} = A+B$, where $W_{qk}$ represents a real square matrix, A represents a real symmetric matrix, B represents an antisymmetric matrix, A is calculated by $A=W_{qk}+W_{qk}^T/2$, and B is calculated by $B=W_{qk}-W_{qk}^T/2$; decompose based on properties of the real symmetric matrix and the antisymmetric matrix as $A=P \cdot D \cdot P^T$, and $B=U \cdot C \cdot U^T$, where P represents an orthogonal matrix, D represents a diagonal matrix, U represents an invertible matrix, and C represents a block diagonal matrix;
    a preprocessing unit configured to process an input matrix X and matrixes P, D, U and C obtained by the decomposition unit in row and column, respectively, and input the processed matrixes into a computing unit after being staggered;
    a computing unit configured to perform multiply-accumulate computation on the matrixes outputted by the preprocessing unit using the resistive random access memory as a computing element to obtain a product matrix, wherein a formula of the multiply-accumulate computation is $Out=P' \cdot D \cdot P'^T + U' \cdot C \cdot U'^T$, where $P'=X \cdot P$, $U'=X \cdot U$, and Out represents an attention score;
    a cache unit configured to store an intermediate result computed by the computing unit temporarily into the cache unit; and
    a self-attention mechanism unit configured to perform normalization computing on the product matrix Out obtained by the computing unit using a hybrid softmax computing array of a process-in-memory logic based on the resistive random access memory to obtain data $\text{softmax}[(P' \cdot D \cdot P'^T + U' \cdot C \cdot U'^T)/dk^{0.5})]$, where dk represents a dimension of a key-value matrix K, and perform matrix multiply computation on the obtained data $\text{softmax}[(P' \cdot D \cdot P'^T + U' \cdot C \cdot U'^T)/dk^{0.5})]$, the input matrix X and the weight matrix $W_V$ to obtain a self-attention weight coefficient.

2. The process-in-memory architecture according to claim 1, wherein the three network parameter weight matrixes $W_Q$, $W_K$ and $W_V$ are randomly initialized when an initial Transformer neural network performs self-attention computation, and a query matrix Q, a key-value matrix K and a value matrix V are obtained by multiplying by the input matrix X after adding positional information.

3. The process-in-memory architecture according to claim 2, wherein the self-attention computation of the Transformer neural network is calculated by $\text{softmax}(Q \cdot K^T/dk^{0.5}) \cdot V$, and the attention score $Out=Q \cdot K^T$ expanded as $Q K^T = (X \cdot W_Q) \cdot (X \cdot W_K)^T = X(W_Q \cdot W_K^T)X^T$;
    wherein a product result $W_{qk}$ based on $W_Q \cdot W_K^T$ is a square matrix, $W_{qk}$ is decomposed to be a sum of a real symmetric matrix A and an antisymmetric matrix B based on properties of the square matrix, and A is calculated by $A=W_{qk}+W_{qk}^T/2$, B is calculated by $B=W_{qk}-W_{qk}^T/2$; and
    wherein decomposition results $A=P' \cdot D \cdot P^T$, and $B=U \cdot C \cdot U^T$ i are obtained based on the properties of the real symmetric matrix and the antisymmetric matrix using orthogonal decomposition of the real symmetric matrix and Schur decomposition of the antisymmetric matrix, and D and C are in the following forms: $D=\text{diag}(\lambda_1, \lambda_2, \ldots, \lambda_i)$, where $\lambda_i$ represents an eigenvalue of the real symmetric matrix A, $i \in \{1,2,\ldots,m\}$, m represents a number of rows of the weight matrix; and $$C = \text{diag}\left\{\begin{pmatrix} 0 & 1 \\ -1 & 0 \end{pmatrix}, \ldots, \begin{pmatrix} 0 & 1 \\ -1 & 0 \end{pmatrix}, 0, 0, 0, \ldots, 0\right\}.$$

4. The process-in-memory architecture according to claim 1, wherein after the orthogonal matrix P, the invertible matrix U, the diagonal matrix D and the block diagonal matrix C are obtained, the attention score Out is expressed as:

$$\text{Out}=X \cdot (W_Q \cdot W_K^T) \cdot X^T = X \cdot A \cdot X^T + X \cdot B \cdot X^T = (X \cdot P) \cdot D \cdot (X \cdot P)^T + (X \cdot U) C (X \cdot U)^T,$$

where P'=X·P, and U'=X·U, and the attention score Out is simplified to be as follow: Out=P'·D·P'$^T$+U'·C·U'$^T$.

5. The process-in-memory architecture according to claim 1, wherein after the attention score is obtained, the data softmax[(P'·D·P'$^T$+U'·C·U'$^T$)/dk$^{0.5}$)] is obtained using the hybrid softmax computing array of the process-in-memory logic based on the resistive random access memory, and a final self-attention weight coefficient Z is obtained by successively multiplying by the input matrix X and the weight matrix $W_V$, expressed as:

$$Z=\text{softmax}[(P' \cdot D \cdot P'^T + U'C \cdot U'^T)/dk^{0.5})] \cdot X \cdot W_V.$$

6. The process-in-memory architecture according to claim 1, wherein a complex matrix-to-matrix multiplication operation is simplified into matrix-to-vector multiplication and vector dot products using relevant properties of the symmetric matrix.

7. The process-in-memory architecture according to claim 1, wherein the resistive random access memory is used in a Transformer for matrix vectors and softmax operations.

* * * * *